United States Patent
Soule et al.

(10) Patent No.: US 10,248,708 B2
(45) Date of Patent: Apr. 2, 2019

(54) STORAGE AND REPLICATION IN DISTRIBUTED COMPUTING ENVIRONMENTS

(71) Applicant: Universita della Svizzera italiana, Lugano (CH)

(72) Inventors: Robert Soule, Lugano (CH); Fernando Pedone, Lugano (CH); Marco Canini, Celle Ligure (IT); Huynh T. Dang, Lugano (CH)

(73) Assignee: Universita della Svizzera italiana, Lugano (CH)

( * ) Notice: Subject to any disclaimer, the term of this patent is extended or adjusted under 35 U.S.C. 154(b) by 404 days.

(21) Appl. No.: 15/234,787

(22) Filed: Aug. 11, 2016

(65) Prior Publication Data
US 2017/0316073 A1    Nov. 2, 2017

Related U.S. Application Data

(60) Provisional application No. 62/328,391, filed on Apr. 27, 2016.

(51) Int. Cl.
*G06F 11/00*    (2006.01)
*G06F 17/30*    (2006.01)

(52) U.S. Cl.
CPC .............. *G06F 17/30578* (2013.01)

(58) Field of Classification Search
CPC .............. G06F 11/008; G06F 11/3409; G06F 11/3452; G06F 11/30; G06F 11/00
USPC ........................................................ 714/52
See application file for complete search history.

(56) References Cited

U.S. PATENT DOCUMENTS

| | | | |
|---|---|---|---|
| 2010/0251215 A1* | 9/2010 | Yawalkar | G06F 11/008 717/125 |
| 2013/0232486 A1* | 9/2013 | Chen | G06F 9/455 718/1 |
| 2017/0131949 A1* | 5/2017 | Araki | G06F 3/0659 |
| 2017/0366619 A1* | 12/2017 | Schreter | H04L 67/145 |

* cited by examiner

*Primary Examiner* — Sarai E Butler
(74) *Attorney, Agent, or Firm* — Heslin Rothenberg Farley & Mesiti P.C.

(57) ABSTRACT

An instance of a consensus protocol in initiated by a processor initiating an application program interface to submit a value and obtaining the value. The processor sends a message including the value to one or more hardware components communicatively coupled to the processor. Logic in the hardware components obtains the message and appends the message with a sequence number, where the sequence number identifies the instance. Logic in the hardware accepts the value and supplies the value to the processor. The processor replicates the value for the instance and returns the value to the application via a callback.

20 Claims, 7 Drawing Sheets

200

205

One or more proposer programs obtain a values from an application and issue a request that includes a message with a value.

215

One or more proposer programs utilize one or more coordinator programs to add a sequence number to the message and deliver the message to one or more acceptor programs.

225

One or more acceptor programs select the value and provide memory and execute logic to keep a persistent state, supplying the value to one or more learner programs.

235

Based on a quorum of the one or more acceptor programs selecting the value, one or more learner programs provide replication and return the value to the application via a callback.

PRIOR ART

One or more proposer programs provides an API to an application to submit a value, to initiate the instance of a consensus protocol and upon obtaining the value from the API, sends a message, including the value, to a switch coordinator.

515

The switch coordinator utilizes adds a sequence number to the message and delivers the message to one or more acceptors in one or more switches.

525

One or more acceptors in one or more switches select the value and provide memory and execute logic to keep a persistent state, supplying the value to one or more learner programs.

535

Based on a quorum of the one or more acceptors selecting the value, one or more learner programs replicate the value for the instance and return the value to the application via a callback.

FIG. 5

STORAGE AND REPLICATION IN DISTRIBUTED COMPUTING ENVIRONMENTS

CROSS REFERENCE TO RELATED APPLICATION

The present invention claims priority from U.S. provisional patent application No. 63/328,391, entitled "IMPROVEMENT OF STORAGE AND REPLICATION IN DISTRIBUTED COMPUTING ENVIRONMENTS" filed Apr. 27, 2016, which is hereby incorporated herein by reference in its entirety.

TECHNICAL FIELD

The present disclosure generally relates to a system for improving the performance of storage and replication systems that are the fundamental infrastructure for distributed computing environments, including but not limited to cloud computing services.

BACKGROUND

Consensus is a fundamental problem for distributed systems, including but not limited to, cloud computing environments. Because consensus protocols play a key role in reliable computing, there is significant interest in optimizing their performance. Consensus entails getting a group of participants (i.e., computing nodes in the environment) to reliably agree on some value used for computation (e.g., the next valid application state). Several protocols have been proposed to solve the consensus problem which form a foundation for building fault-tolerant systems, including the core infrastructure of data centers. For example, consensus protocols are the basis for state machine replication, which is used to implement key services, such as software-based services that maintain long-lived, critical state (such as configuration information) and to synchronize distributed components (e.g., OpenReplica), software-based services that implement object storage on a single distributed computer cluster, and to provide interfaces for object, block, and file level storage (e.g., Ceph), and software services that synchronize accesses to shared resources (e.g., Chubby). Moreover, several important distributed problems can be reduced to consensus, such as atomic broadcast and atomic commit.

SUMMARY

Shortcomings of the prior art are overcome and additional advantages are provided through the provision of a method of integrating processes of a consensus protocol into network hardware. The method includes, for instance: providing, by one or more processors, an application program interface to an application to submit a value; based on obtaining the value through the API, initiating, by the one or more processors, an instance of a consensus protocol, wherein the initiating comprises sending a message comprising the value to one or more hardware components communicatively coupled to the one or more processors; obtaining, by logic executed in the one or more hardware components, the message and appending the message with a sequence number, wherein the sequence number identifies the instance; accepting, by additional logic executed in the one or more hardware components, the value and supplying the value to the one or more processors; and replicating, by the one or more processors, the value for the instance and returning the value to the application via a callback.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2 is a workflow illustrating aspects of a software-based implementation of a consensus protocol;

FIG. 5 is a workflow illustrating aspects of an embodiment of the present invention;

DETAILED DESCRIPTION

Figure 1:
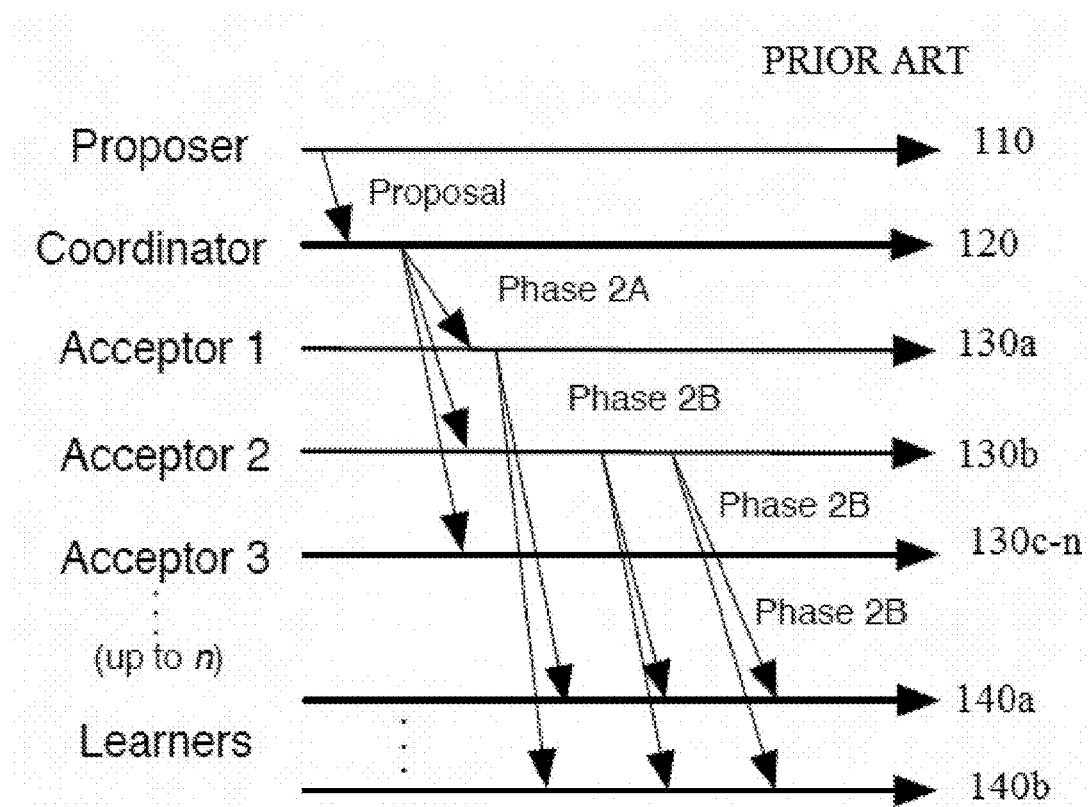
FIG. 1 is a diagram depicting aspects of a consensus protocol.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Embodiments of the present invention increase the performance of consensus protocols (which are used, for example, by most applications in data centers) by moving some of the logic into hardware devices. Embodiments of the present invention include a computer program product, method and system that includes optimized consensus protocols that leverage advances in network programmability and hardware design to improve the performance of storage and replication systems that are the fundamental infrastructure for distributed and cloud computing services. Aspects of the present invention include implementing the Paxos consensus protocol in network forwarding devices and/or an alternative, optimistic protocol which can be implemented within existing computing infrastructure, without changing, for example, the OpenFlow application program interface (API), a programming interface inside the OpenFlow switch software architecture that provides isolation between vendor specific hardware details and OpenFlow switch implementations. The protocols may utilize assumptions about how the network orders messages. As understood by one of skill in the art, Paxos is a family of protocols for solving consensus in a network of unreliable processors.

As understood by one of skill in the art, consensus protocols are the foundation for building many fault-tolerant distributed systems and services, including but not limited to, cloud computing solutions. Embodiments of the present invention represent advantages to consensus protocol implementations in computing environments by leveraging commodity networking hardware design and programmability to implement consensus protocol logic in network devices, and offering consensus as a network service (CAANS and/or NetPaxos). Embodiments of the present invention provide a complete Paxos protocol as a drop-in replacement for software-based implementations of Paxos. Embodiments of the present invention do not restrict network topologies and are implemented in a higher-level, data-plane programming language, allowing for portability across a range of target devices.

Embodiments of the present invention provide advantages and improvements that are inextricably tied to computer technology. Certain embodiments of the present invention significantly increase throughput and reduce latency for consensus operations. Unlike in software-based consensus solutions, embodiments of the present invention, which execute in hardware, can transmit consensus messages at line speed, with latency only slightly higher than simply forwarding packets. For example, in embodiments of the present invention, since the logic traditionally performed at servers is executed directly in the network, consensus messages travel fewer hops, resulting in decreased latency. Additionally, rather than executing server logic in software, which adds overhead for passing packets up the protocol stack and involves expensive message broadcast operations, in certain embodiments of the present invention, the same operations are realized "on the wire" by specialized hardware, improving both latency and throughput.

Embodiments of the present invention provide advantages over prior attempts at hardware-based consensus protocol solutions. For example, attempts have been made to implement consensus protocol algorithms in field-programmable gate arrays (FPGAs). However, these prior FPGA implementations do not provide an application-level API. Thus, any application that wishes to use consensus must also be implemented inside of the FPGA and developing an application more complex than a key-value store could prove a daunting task. Another challenge of this implementation is that it is platform-specific, and is not portable to other network devices, such as programmable application specific integrated circuits (ASICs), Network Processor Units (NPUs), or other FPGA boards. Additionally, atomic broadcast solutions utilized in this FPGA implementation thus far are have not been used in storage systems other than a specific centralized service for maintaining configuration information, naming, and providing distributed synchronization (i.e., ZooKeeper). Embodiments of the present invention do not include the same limitations as the FPGA solutions because embodiments of the present invention implement a complete Paxos protocol, are a drop-in replacement for software-based implementations, and are implemented in a higher-level, data-plane programming language, which allows for portability across a range of target devices.

Figure 3:
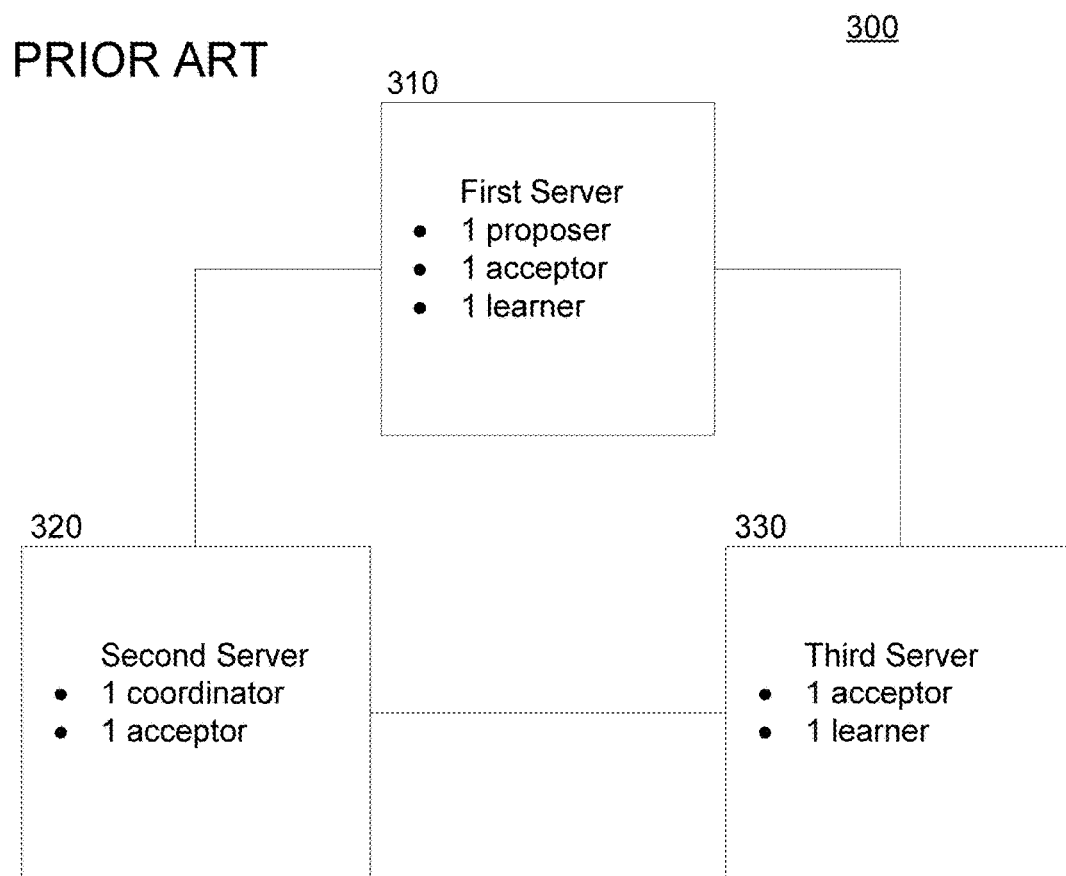
FIG. 3 depicts aspects of a technical environment into which aspects of a software-based consensus protocol have been implemented.
Figure 4:
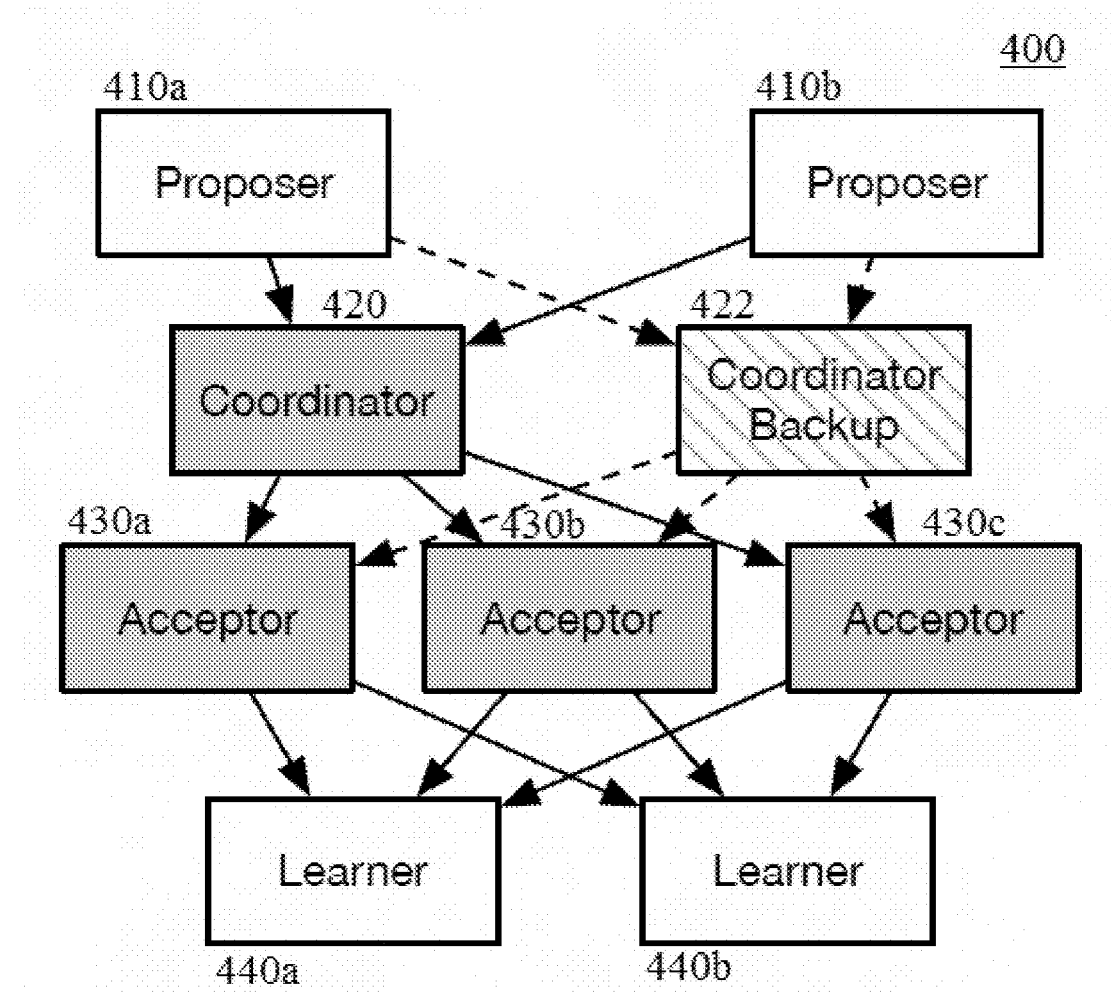
FIG. 4 depicts an implementation of an embodiment of the present invention in which processes are executed in both software and hardware aspects of the implementation.

Embodiments of the present invention (which, as aforementioned, can be referred to as CAANS and/or NetPaxos) move coordinator and acceptor logic utilized in Paxos into network hardware. In order to implement what was software-based logic into the hardware of a network, preparing a networking environment to utilize this approach includes mapping Paxos messages into a format that can be processed by network devices and modifying network devices to execute consensus logic. In order to illustrate aspects of embodiments of the present invention, characteristics of Paxos protocol in general are reviewed in order to highlight the contrasts and advantages of aspects of embodiments of the present invention, when contrasted with traditional software-based consensus protocol approaches. FIGS. 1-3 illustrate a software implementation of the Paxos consensus protocol and FIGS. 4-5 illustrate certain aspects of a hardware-specific implementation of a consensus protocol in an embodiment of the present invention.

FIG. 1 illustrates a communication pattern utilized by the Paxos consensus protocol. As will be discussed later, embodiments of the present invention offer advantages over traditional implementations of this protocol in software because in software implementations, latencies are created because the coordinator and acceptor processes, which as discussed herein, are performance bottlenecks.

As understood by one of skill in the art, Paxos is a fault-tolerant consensus protocol that has been proven safe under asynchronous assumptions (i.e., when there are no timing bounds on message propagation and process execution), live under weak synchronous assumptions, and resilience-optimum. As illustrated in FIG. 1, Paxos distinguishes roles in a consensus, a process of agreeing on one result among a group of participants, for example, in state machine replication. In a traditional implementation of Paxos, different applications (e.g., program code, one or more programs) provide different types of functionality, for example, one or more programs may act as proposers, coordinators, acceptors and/or learners. These programs can be executed by one or more computing nodes, including by one or more processing circuits on one or more servers. Clients of a replicated service are typically proposers, which utilize coordinators to propose commands ordered by Paxos, before they are learned and executed by the replicated state machines. These replicas typically play the roles of acceptors (i.e., the processes that agree on a value) and learners. Paxos is resilience-optimum because it tolerates the failure of up to f acceptors from a total of 2f+1 acceptors, to ensure progress, where a quorum of f+1 acceptors are non-faulty.

In practice, replicated services run multiple executions (i.e., instances) of the Paxos protocol to achieve consensus on a sequence of values. An instance of Paxos may proceed in two phases. The second of these phases is illustrated in FIG. 1 as including Phase 2A and Phase 2B. During the first phase, program code executed by at least one processor comprises a proposer for submitting a value and selects a unique round number and sends a prepare request to program code comprising a group of acceptors (i.e., a quorum or more). Upon receiving a prepare request with a round number bigger than any previously received round number, the program code of the acceptor(s) responds to the proposer that it will reject any future prepare requests with smaller round numbers. If the acceptor already accepted a request for the current instance, program code comprising the acceptor will return the accepted value to the proposer, together with the round number received when the request was accepted. When the proposer has obtained answers from a quorum of acceptors, the program code of the proposer proceeds to the second phase of the protocol.

This second phase of the Paxos protocol is illustrated by FIG. 1. Referring to FIG. 1, the program code comprising the proposer 110 proposes a value (see FIG. 1, Proposal) via program code comprising a coordinator 120 (see FIG. 1, Phase 2A). Program code comprising more than one acceptor 130*a-n* accepts the value and communicates that it will not accept any more proposals for the given Paxos instance. Based on obtaining a quorum of messages from the program code comprising the acceptors (see FIG. 1, Phase 2B), the program code comprising learners 140*a-b* deliver the value. If an acceptor 130*a-n* returns this initial value from the proposer 110, the proposer 110 may choose a value with the highest round number. The proposer 110 program code then sends an accept request with the round number to at least a quorum of acceptors 130*a-n*. When receiving such a request, the acceptors 130*a-n* acknowledge it by sending a message to at least one learner 140*a-b*, unless the acceptors 130*a-n* have already acknowledged another request with a higher round number. However, if no acceptor 130*a-n* program code accepts the initial value proposed, the proposer 110 program code selects a new value for the instance to propose to the program code of the acceptors 130*a-n*. An acceptor 130*a-n* may send an acknowledgment to a proposer 110. When a quorum of acceptors 130*a-n* accepts a value, consensus is reached. If multiple proposers 110 simultaneously execute the procedure above for the same instance, then no proposer 110 may be able to execute the two phases of the protocol and reach consensus.

FIG. 2 is a workflow 200 that depicts the roles of various aspects of the Paxos protocol. The workflow 200 of FIG. 2 demonstrates how programmable networks enforce particular behavior by utilizing software-based consensus protocols to push logic into network hardware. Unlike in embodiments of the present invention, the protocol logic is executed by software rather than hardware. For consistency and ease of understanding, the workflow 200 references aspects of FIG. 1.

As illustrated in this workflow 200, program code comprising at least one proposer 110 obtains a value from an application and issues a request that includes a message with a value (205). The program code of the proposer 110 utilizes program code of a coordinator 120 to add a sequence number to the message and deliver the message to a quorum of acceptors 130*a-n* (215). Program code in certain of the acceptors 130*a-n* choses the value and provides memory and executes logic to keep a persistent state, supplying the value to program code comprising a learner 140*a-b* (225). Program code comprising a learner 140*a-b* provides replication and returns the value to the application via a callback (235).

The processes described in FIGS. 1-2 may be distributed over servers such that certain of the program code executes on each server. FIG. 3 is an example of a technical architecture 300 that utilizes the Paxos consensus protocol illustrated in FIGS. 1-2. As aforementioned, the various functionalities are embodied by software in this implementation of a consensus protocol. To demonstrate this implementation, FIG. 3 includes three servers where each server includes one or more processors executing program code comprising one or more programs. In this example, a First Server 310 includes one or more processors executing program code comprising one proposer 110, one acceptor 130*a*, and one learner 140*a-b*. A Second Server 320 includes one or more processor executing program code comprising one coordinator 120 and one acceptor 130*b*. A Third Server includes one or more processors executing program code comprising one acceptor 130*c* and one learner 140*a-b*.

As discussed earlier, in software embodiments of the Paxos, the coordinator 120 and acceptor 130*a-n* processes are bottlenecks. In these software embodiments (deployments) of consensus protocols, such as Paxos, the coordinator 120 and acceptor 130*a-n* processes are bottlenecks in part because acceptor 130*a-n* utilization scales with the degree of replication. Embodiments of the present invention address these bottlenecks directly by implementing coordinator 120 and acceptor 130*a-n* processes in network hardware. In embodiments of the present invention (referred to as the CAANS architecture and/or NetPaxos architecture), network hardware executes the logic of coordinators and acceptors. In addition to addressing these bottlenecks, by implementing proposer 110 and learner 140*a-b* code in software, embodiments of the present invention facilitate an application-level interface, which is described in greater detail below. In an embodiment of the present invention, the logic of each of the roles (functionalities) can be encapsulated by communication boundaries.

FIG. 4 illustrates aspects of embodiments of the present invention where a consensus protocol is deployed as a hardware solution, as opposed to the entirely software-based solution illustrated in FIGS. 1-3. Specifically, FIG. 4 includes deploying aspects of the consensus protocol of embodiments of the present invention in switches of a given network. Thus, the technical environment into which aspects of the embodiment of FIG. 4 is implemented includes servers or other computing nodes with processors that execute program code and switch hardware in switches communicatively coupled to the servers.

Deploying roles in a consensus protocol into switches is an example of one type of hardware that can be utilized to port functionality from software to hardware in a network. Further embodiments of the present invention utilize hardware components including, but not limited to, programmable network interface cards (NICs). The flexibility of the hardware into which functionality can be implemented is enabled by the utilization of a Paxos header. In embodiments of the present invention, network hardware is optimized to process packet headers. Paxos messages within the consensus protocol processes are mapped into Paxos-protocol headers. The Paxos header follows a transport protocol header (e.g., User Datagram Protocol (UDP)), allowing CAANS/NetPaxos messages to co-exist with standard network hardware.

Returning to FIG. 4, the arrows between the aspects represent communication. Both the software executed by servers (e.g., proposers 410*a-b*, learners 440*a-b*) and the hardware components, in this example switches (e.g., coordinator 420 and acceptors 430*a-c*) execute various processes that are part of a consensus protocol. Thus, embodiments of the present invention differ from software-based Paxos deployments because certain of the consensus logic is integrated into network hardware, rather than relying entirely upon software defined networking (SDN). Thus, embodiments of the present invention include mapping Paxos messages into a format that can be processed by network devices and modifying network devices to execute the consensus logic. In an embodiment of the present invention, the software-based aspects described are executed by commodity servers.

In FIG. 4, aspects of the consensus protocol deployed in one or more hardware switches include a coordinator 420 and acceptors 430*a-c*. The quantity of each type of entity in this example is offered for illustrative purposes and does not limit the number of each aspect that can be included in embodiments of the present invention. The embodiment of FIG. 4 also includes a coordinator backup 422 that can be deployed in either switch hardware or in a software embodiment on a commodity server on a network. In an embodiment of the present invention, coordinator 420 and acceptor 430*a-c* functionalities are handled by a first switch while backup coordinator 422 functionality is integrated into a second switch. Thus, similar to the software-based Paxos implementations in FIGS. 1-3, embodiments of the present invention include four roles for participants in the consensus protocol: proposers, coordinators, acceptors, and learners.

FIG. 5 is a workflow 500 of an embodiment of the present invention. For ease of understanding, aspects of the present invention in this workflow 500 are referred to as illustrated in FIG. 4. As seen in FIG. 5, in an embodiment of the present invention, program code executed by one or more processors (i.e., a proposer 410*a-b*) initiates an instance of a consensus protocol by obtaining a value from an application and sending a message to a switch (coordinator 420) configured to coordinate consensus, i.e., the process of the varied network components agreeing on one result (505). The process follows a similar path to that described regarding FIGS. 1-2. However, certain aspects differ based on the integration of functionality into the hardware of the network. In an embodiment of the present invention, the proposer 410*a-b*, before forwarding the message to the coordinator 420, a hardware component of the network, such as a switch, encapsulates the message in a (Paxos) header. Utilizing standard sockets, the program code of the proposer 410*a-b* further encapsulates the Paxos header inside a UDP datagram. By encapsulating the header inside a UDP datagram, program code of various aspects of the embodiment of the present invention can rely on the UDP checksum to ensure data integrity.

In an embodiment of the present invention the P4 language is utilized to program the network forwarding devices. As understood by one of skill in the art, additional data plane languages may also be utilized in embodiments of the present invention, including but not limited to POF. Hardware devices utilized in embodiments of the present invention may also be programmed utilizing hardware programming languages, like BlueSpec, Verilog, and/or VHDL. These languages are given as examples for utilization in certain embodiments of the present invention and are not meant to imply any constraints on a particular language for utilization in the implementation of aspects of an embodiment of the present invention.

In an embodiment of the present invention, if the (switch) coordinator 420 fails, it can be replaced by either another switch or comparable hardware component or a coordinator in software, running on a server that temporarily assumes the role. If a software coordinator is chosen, it can be co-located with a proposer 410*a*-410*b*.

In an embodiment of the present invention, when a coordinator 420 is replaced, a new coordinator obtains the last consensus instance used. If the next instance the new coordinator uses is smaller than the last instance used by the failed switch coordinator, then new values will not be accepted until the new coordinator catches up with the last instance used. If the next instance used is greater than the last instance used, the learners 440*a-b* will identify gaps in the sequence of learned values and will fill in these gaps using a recover procedure described below.

Returning to FIG. 5, in an embodiment of the present invention, in initiating an instance of a consensus protocol by obtaining a value from an application and sending a message to a switch (coordinator 420), (505), a proposer 410*a-b* provides an API to an application to submit a value, and initiate the instance of a consensus protocol. Thus, proposer program code provides an API to an application to submit a value, to initiate the instance of a consensus protocol and upon obtaining the value from the API, sends a message, including the value, to a switch coordinator (505). Hence, as in FIG. 2, the program code comprising the proposer 410*a-b* issues a request that includes a message with a value. Upon receipt by the coordinator 420, which is integrated into switch hardware, the switch hardware adds a sequence number to the message and delivers the message to at least a quorum of acceptors 530*a-c* (515). As discussed regarding FIG. 2, a learner 401*a*-410*b* replicates a value based upon a quorum of acceptors selecting the value. This selection process can be characterized as voting.

In embodiments of the present invention where the coordinator functionality is integrated into switch hardware, the coordinator brokers requests on behalf of proposers, ensures that proposers will not compete for a particular instance (thus ensuring that every instance terminates), and imposes an ordering of messages from the proposers 410*a-b*. In an embodiment of the present invention, to order messages from proposers 410*a-b*, the coordinator 420 implements a monotonically increasing sequence number, binding messages that come from proposers to consensus instances. As aforementioned, the coordinator 420 of an instance transmits the instance to acceptors 430*a-c*, which are, like the coordinator 420, deployed in the switch hardware.

In an embodiment of the present invention, the acceptors 430*a-c* choose the value and provide memory and execute logic to keep a persistent state (525). In an embodiment of the present invention, acceptors in the hardware are responsible for choosing a single value for a particular (Paxos) instance. Thus, for every instance of consensus, each acceptor 430*a-c* votes for a value and the coordinator 420 delivers a given value to program code comprising a learner 440*a-b*, if a pre-determined number (e.g., quorum) of acceptors 430*a-c* vote for the given value (525).

In an embodiment of the present invention, acceptors 430*a-c* maintain a history of proposals for values for which they have voted in a memory internal or accessible to the hardware into which the acceptors are integrated. When evaluating a given proposed value from a coordinator 420, an acceptor 430*a-c* may reference the saved history and refrain from voting for values upon which it has already voted for a particular instance. By the acceptors 430*a-c* maintaining a history of evaluated values, embodiments of the present invention enable the consensus protocol to tolerate lost or duplicate messages.

To address space concerns related to maintaining a history, in an embodiment of the present invention, the acceptors 430*a-c* may obtain a message, for example, from the program code of one or more learner 440*a-b* (e.g., f+1 learners) informing the acceptors 430*a-c* that they can trim the history (e.g., log) to a particular instance number. The instance number and frequency of this type of message may depend upon specific applications executed within the network.

In an embodiment of the present invention, the number of instances that can be tracked is bounded by the memory available to the acceptors 430*a-c* to store the consensus history, which is addressed by the inst field of a Paxos header, an example of which appears and is discussed below. In an embodiment of the present invention, the storage buffer of the acceptors 430*a-c* can be overwritten with newer consensus values when older values are not needed. Whether and when to limit the consensus values stored in history may be determined by the memory available on devices in the network utilized as acceptors 430*a-c*.

In an embodiment of the present invention, the storage available to the acceptors 430a-c is persistent. Thus, if the acceptor 430a-c fails, and then restarts, it can recover its durable state.

Returning to FIG. 5, in an embodiment of the present invention, program code comprising one or more learners 440a-b obtains votes from the acceptors 430a-c if a majority of votes are the same (i.e., there is a quorum) for a given value and replicates the given value for a given consensus instance (535). In an embodiment of the present invention, this program code additionally returns the value to the application via a callback (545). Thus, learners 440a-44b are responsible for replicating a value for a given consensus instance.

As aforementioned, in an embodiment of the present invention, a proposer 410a-b provides an API to an application to submit a value, and initiates the instance of a consensus protocol. This API enables aspects of the present invention to provide a drop-in replacement for software-based implementations of consensus protocols, such as that illustrated in FIGS. 1-3. In an embodiment of the present invention, the API may be similar or identical to an API utilized with a Paxos software library. In an embodiment of the present invention, this API includes three functions, a non-limiting example of which is provided below. The functions include a submit function, a deliver function, and a recover function.

```
void submit (struct paxos_ctx*ctx,
    char*value,
    int size);
void (*deliver) (struct paxos_ctx*ctx,
    int instance,
    char*value,
    int size);
void recover (struct paxos_ctx*ctx,
    int instance,
    char*value,
    int size);
```

The submit function sends a value. Referring to FIG. 4 to illustrate this functionality, the submit function of the API, illustrated above, is called by the program code of the proposer 410a-b when an application (e.g., using Paxos) sends a value, which, based on agreement of the acceptors 430a-c, could comprise the next valid application state. In an embodiment of the present invention, the application passes a character buffer containing the value, and the buffer size to the proposers 410a-410b. The paxos_ctx struct maintains related state across invocations (e.g., socket file descriptors). As understood by one of skill in the art, a struct is a complex data type declaration that defines a physically grouped list of variables to be placed under one name in a block of memory, allowing the different variables to be accessed via a single pointer.

The deliver function delivers the value. In an embodiment of the present invention, the deliver function is utilized such that a learner 440a-b may acquire the value that may comprise the next valid application state. The application registers a callback function with a type signature of deliver. To register the function, the application sets a function pointer in the paxos_ctx struct. When a learner 440a-b obtains a value (e.g., a value that has been accepted by a pre-defined number of acceptors 430a-430c) from an acceptor 430a-c, the learner 440a-b calls this application-specific deliver function. The deliver function returns a buffer containing the learned value, the size of the buffer, and the instance number for the learned value.

The recover function enables access to a prior value. In an embodiment of the present invention, the application utilizes the recover function to discover a previously agreed upon value for a particular instance of consensus. As seen above, the recover function results in the same sequence of Paxos messages as the submit function except that the application must pass the consensus instance number as a parameter, as well as an application-specific no-op (no operation) value (i.e., a computer instruction that takes up a small amount of space and specifies no operation so that the processor moves to the next sequential instruction). Thus, in an embodiment of the present invention, the resulting deliver callback will either return the accepted value, or return the no-op value, if no value had been previously accepted for the particular instance number.

An example of when the recover function may be utilized includes when a slow learner needs to find out what the value of a certain instance was, for example, if the program code of the learner observes gaps in Paxos instances and determines, based on the gaps, that the learner is lagging behind, but a fresh checkpoint is not (yet) available. The program code can utilize the recover API to discover what value was accepted for a given consensus instance. Additionally, in an embodiment of the present invention, learners that miss the decision of a consensus instance can find out the value decided by contacting the acceptors through the recover API. To find out the value decided in a given instance, k, the API performs a new execution of the protocol while proposing a no-op value in consensus k and waits for the result. If a value was decided in k, the learner will receive the value, assuming a quorum of acceptors; otherwise, no-op will be decided in k and discarded by the application.

As aforementioned, embodiments of the present invention utilize a customized header in order to communicate a message throughout the software and hardware components of a given technical environment. In a traditional Paxos implementation, as depicted in FIGS. 1-3, each participant (e.g., proposer, coordinator, acceptor, learner) receives messages of a particular type, executes some processing logic, and then synthesizes a new message that it sends to the next participant in the protocol. Embodiments of the present invention utilize network hardware in communications and hardware does not craft messages, thus, the components instead modify a message header of a packet being processed. Thus, because embodiments of the present invention include aspects that are network-based, program code in the software and hardware aspects map participant logic into forwarding and header rewriting decisions such that a message a proposer 410 (FIG. 4) to a coordinator 420 (FIG. 4) is transformed into a message from the coordinator 420 to each acceptor 430a-430c by rewriting certain fields. The size of the message is not changed at a hardware component (e.g., switch, NIC), so each packet contains a union of all fields in all Paxos messages. Below is an example of a header that can be utilized in an embodiment of the present invention.

```
struct paxos_t {
    uint8_t msgtype;
    uint8_t inst[INST_SIZE];
    uint8_t rnd;
    uint8_t vrnd;
    uint8_t swid[8]
    uint8_t value[VALUE_SIZE];
};
```

As seen above, the header example is written as a C struct. In embodiments of the present invention, the size of the header is limited in order to increase the efficiency of the operation of the consensus protocol. Semantics of some of the fields change depending on which type of component sends the message. In the example above, msgtype distinguishes the various Paxos messages (e.g., phase 1A, 2A). The variable inst is utilized for the consensus instance number. The variable md is either the round number computed by the proposer or the round number for which the acceptor has cast a vote while vrnd is the round number in which an acceptor has cast a vote. The variable swid identifies the sender of the message. The value contains the request from the proposer or the value for which an acceptor (FIG. 4, 440a-c) has cast a vote.

Figure 6:
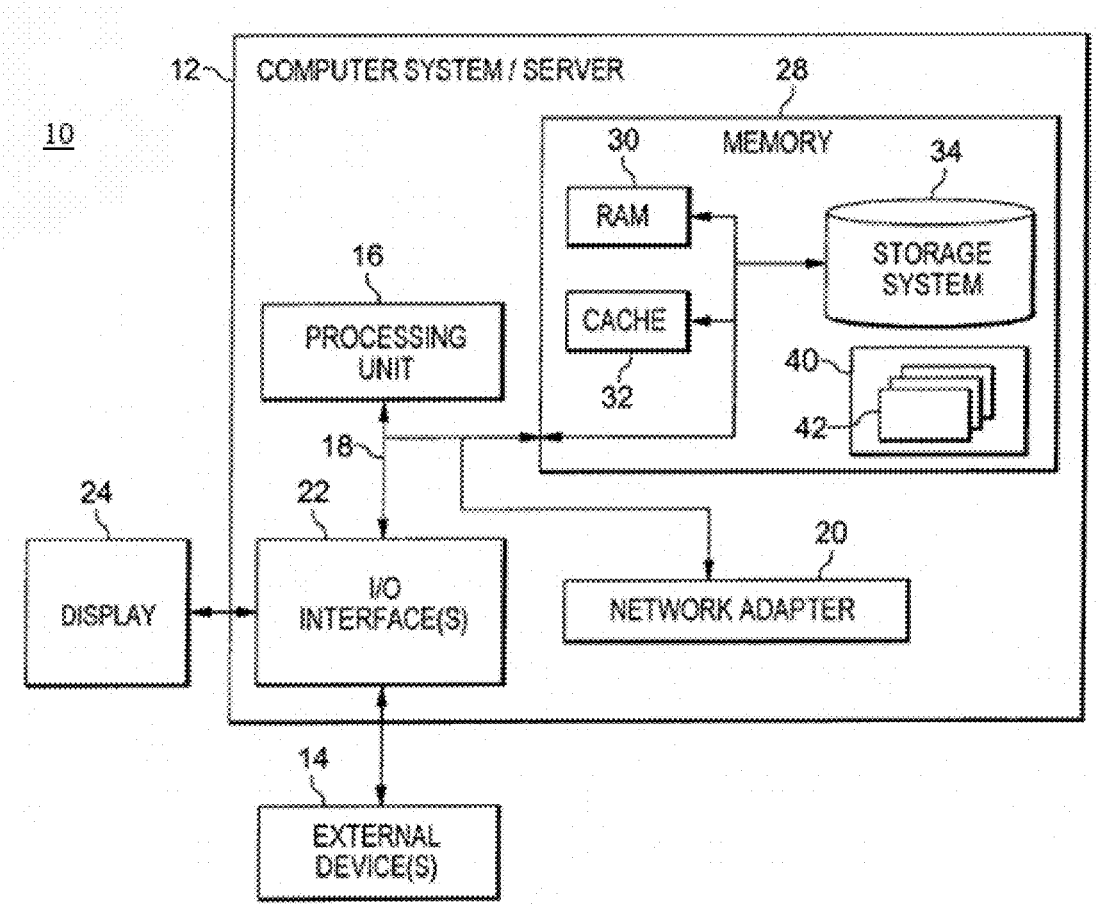
FIG. 6 depicts one embodiment of a computing node that can be utilized to implement certain aspects of an embodiment of the present invention.

As understood by one of skill in the art, aspects of the present invention can be implemented on one or more nodes of a computing system, which can optionally include one or more nodes of a cloud computing environment. FIG. 6 depicts an embodiment of a computing node that may include a server or other computing resource in a system into which aspects of the present invention are implemented, such as one or more of: a proposer 410a-b (FIG. 4), a coordinator backup 422 (FIG. 4), and/or a learner 440a-b (FIG. 4). Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. The computing node 10 may comprise a node of a cloud computing environment or another distributed computing environment. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions (referred to also as program code), such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Computing nodes on a network may communicate with each other utilizing a switch and/or hub. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
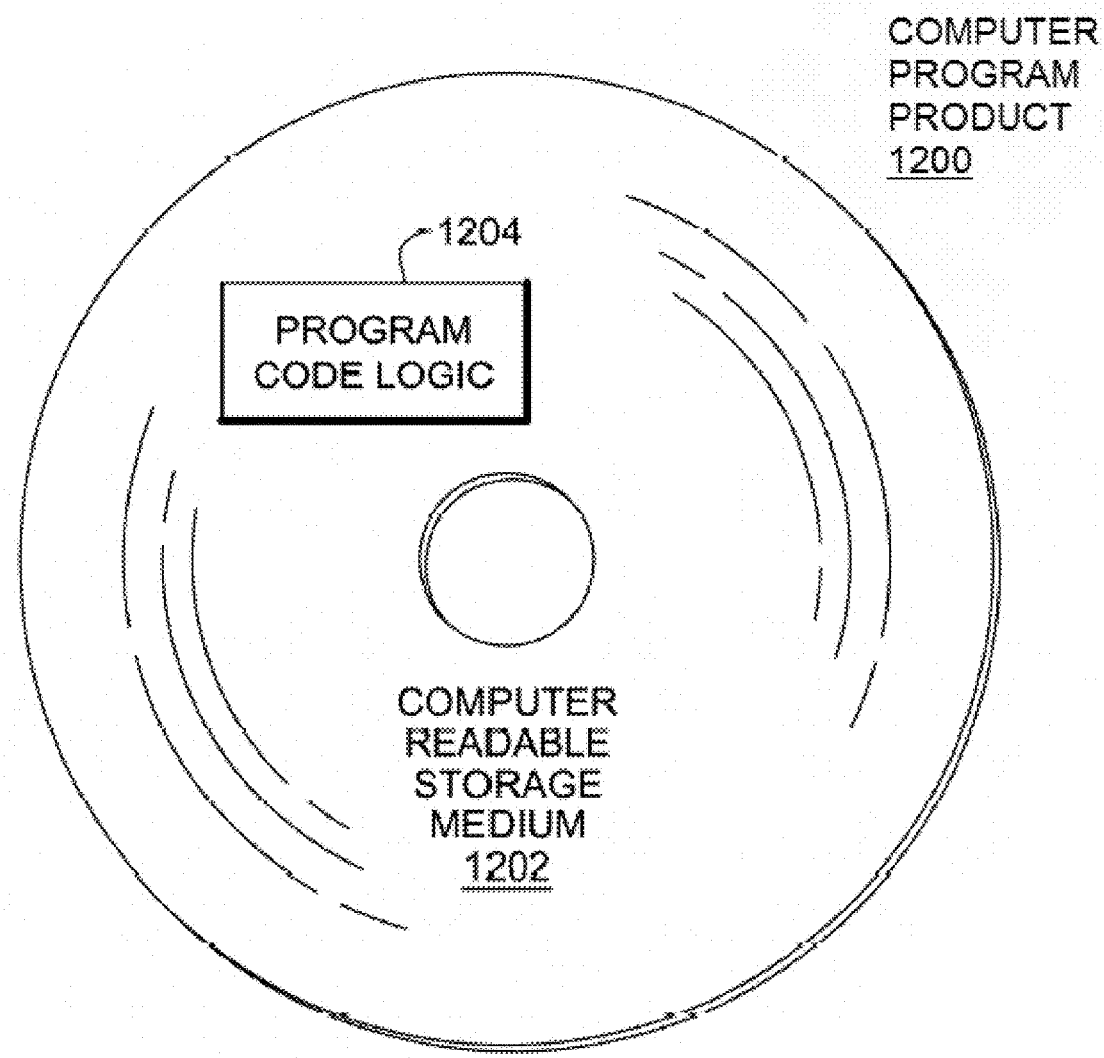
FIG. 7 depicts a computer program product which can be utilized in an embodiment of the present invention.

The computer program product may include a computer readable storage medium (or media) having computer readable program instructions thereon for causing a processor to carry out aspects of the present invention. Referring to FIG. 7, in one example, a computer program product 1200 includes, for instance, one or more non-transitory computer readable storage media 1202 to store computer readable program code means, logic and/or instructions 1204 thereon to provide and facilitate one or more embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. The hardware elements of the network may also be programmable and comprise program code to execute various processes. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages and network data-plane programming languages such as P4 and POF. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Although various embodiments are described above, these are only examples. For example, computing environments of other architectures can be used to incorporate and use one or more embodiments. Further, different instructions, instruction formats, instruction fields and/or instruction values may be used. Yet further, although examples of values for abort codes and condition codes are provided, other values may be used. Moreover, different, other, and/or additional restrictions/constraints may be provided/used. Yet further, other intervals may be provided and/or used in differing ways. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising: providing, by one or more processors, an application program interface to an application to submit a value; based on obtaining the value through the application program interface (API), initiating, by the one or more processors, an instance of a consensus protocol, wherein the initiating comprises sending a message comprising the value to one or more hardware components communicatively coupled to the one or more processors; obtaining, by logic executed in the one or more hardware components, the message and appending the message with a sequence number, wherein the sequence number identifies the instance; accepting, by additional logic executed in the one or more hardware components, the value and supplying the value to the one or more processors; and replicating, by the one or more processors, the value for the instance and returning the value to the application via a callback.

2. The computer-implemented method of claim 1, the accepting further comprising:
providing, by the additional logic, a memory to store the value and the sequence number of the instance; and
retaining, by the additional logic, a persistent state based on accepting the value.

3. The computer-implemented method of claim 2, wherein the accepting further comprises:
determining, by the additional logic, based on a history of proposed values stored in the memory, that the value was not previously received for the instance; and
based on the determining, supplying, by the additional logic, the value to the one or more processors.

4. The computer-implemented method of claim 1, wherein the replicating is based on the accepting by a pre-defined number of the one or more hardware components.

5. The computer-implemented method of claim 1, the initiating further comprising:
encapsulating, by the one or more processors, the message in a header, wherein the header is modified by the logic and by the additional logic.

6. The computer-implemented method of claim 5, the initiating further comprising:
encapsulating, by the one or more processors, the header inside a User Datagram Protocol datagram, such that a User Datagram Protocol checksum of the message ensures data integrity of the message.

7. The computer-implemented method of claim 1, wherein the one or more hardware components comprise at least one of: a switch or a programmable network interface card.

8. The computer-implemented method of claim 1, further comprising:
retaining, by the additional logic, the replicated value in the memory.

9. The computer-implemented of claim 8, further comprising:
obtaining, by the one or more processors, a request for the replicated value for the instance;
based on locating the replicated value for the instance in the memory, delivering a callback comprising the replicated value; and
based on not locating the replicated value for the instance in the memory, delivering a callback comprising a no-op value.

10. The computer-implemented method of claim 1, further comprising:
subsequent to initiating the instance, sending, by the one or more processors, a second message comprising a new value to one or more hardware components communicatively coupled to the one or more processors;
obtaining, by logic executed in the one or more hardware components, the second message and appending the message with the sequence number;
rejecting, by additional logic executed in the one or more hardware components, the new value.

11. A system comprising: a memory; one or more processors in communication with the memory; one or more hardware components communicatively coupled to the one or more processors and the memory; and program instructions executable by the one or more processors via the memory to perform a method, the method comprising:
providing, by the one or more processors, an application program interface to an application to submit a value; based on obtaining the value through the application program interface (API), initiating, by the one or more processors, an instance of a consensus protocol, wherein the initiating comprises sending a message comprising the value to the one or more hardware components communicatively coupled to the one or more processors; obtaining, by logic executed in the one or more hardware components, the message and appending the message with a sequence number, wherein the sequence number identifies the instance; accepting, by additional logic executed in the one or more hardware components, the value and supplying the value to the one or more processors; and replicating, by the one or more processors, the value for the instance and returning the value to the application via a callback.

12. The system of claim 11, the accepting further comprising:
providing, by the additional logic, a memory to store the value and the sequence number of the instance; and
retaining, by the additional logic, a persistent state based on accepting the value.

13. The system of claim 12, wherein the accepting further comprises:
determining, by the additional logic, based on a history of proposed values stored in the memory, that the value was not previously received for the instance; and
based on the determining, supplying, by the additional logic, the value to the one or more processors.

14. The system of claim 13, wherein the replicating is based on the accepting by a pre-defined number of the one or more hardware components.

15. The system of claim 11, the initiating further comprising:
encapsulating, by the one or more processors, the message in a header, wherein the header is modified by the logic and by the additional logic.

16. The system of claim 15, the initiating further comprising:
encapsulating, by the one or more processors, the header inside a User Datagram Protocol datagram, such that a User Datagram Protocol checksum of the message ensures data integrity of the message.

17. The system of claim 11, wherein the one or more hardware components comprise at least one of: a switch or a programmable network interface card.

18. The system of claim 11, further comprising:
retaining, by the additional logic, the replicated value in the memory.

19. The system of claim 18, further comprising:
obtaining, by the one or more processors, a request for the replicated value for the instance;
based on locating the replicated value for the instance in the memory, delivering a callback comprising the replicated value; and
based on not locating the replicated value for the instance in the memory, delivering a callback comprising a no-op value.

20. The system of claim 11, the method further comprising:
subsequent to initiating the instance, sending, by the one or more processors, a second message comprising a new value to one or more hardware components communicatively coupled to the one or more processors;
obtaining, by logic executed in the one or more hardware components, the second message and appending the message with the sequence number;
rejecting, by additional logic executed in the one or more hardware components, the new value.

* * * * *